(12) United States Patent
Dienhart et al.

(10) Patent No.: US 10,308,097 B2
(45) Date of Patent: Jun. 4, 2019

(54) TEMPERATURE SENSOR FOR THE HEAT EXCHANGER OF A MOTOR VEHICLE AIR CONDITIONING SYSTEM

(71) Applicant: Ford Global Technologies, LLC, Dearborn, MI (US)

(72) Inventors: Bernd Dienhart, Cologne (DE); Volker Knoche, Leichlingen (DE); Dietmar Fischer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 15/405,736

(22) Filed: Jan. 13, 2017

(65) Prior Publication Data
US 2017/0210206 A1 Jul. 27, 2017

(30) Foreign Application Priority Data
Jan. 22, 2016 (DE) ........................ 10 2016 200 942

(51) Int. Cl.
G01F 11/30 (2006.01)
B60H 1/32 (2006.01)
B60H 1/00 (2006.01)

(52) U.S. Cl.
CPC ......... B60H 1/323 (2013.01); B60H 1/00328 (2013.01); B60H 1/3227 (2013.01); B60H 2001/3263 (2013.01)

(58) Field of Classification Search
CPC ...... G06F 11/30; G01K 1/14; G01K 2201/02; B60H 1/3227; B60H 2001/3263
USPC ....... 374/29, 30–39, 141, 145; 165/253, 287
See application file for complete search history.

(56) References Cited

U.S. PATENT DOCUMENTS

| | | | | |
|---|---|---|---|---|
| 3,777,696 A | * | 12/1973 | Bilbrey | G01K 1/14 116/263 |
| 3,822,684 A | * | 7/1974 | Salway | F02D 41/365 123/146.5 A |
| 5,785,284 A | | 7/1998 | Cesari et al. | |
| 7,775,708 B2 | * | 8/2010 | Barkic | G01K 1/16 374/141 |
| 7,856,341 B2 | * | 12/2010 | Carlson | G01K 3/005 165/104.11 |
| 7,896,834 B2 | * | 3/2011 | Smisson, III | A61M 1/0281 604/67 |
| 8,033,718 B2 | * | 10/2011 | Nishiyashiki | G01K 1/14 165/11.1 |
| 8,444,318 B2 | * | 5/2013 | Huck | G01K 1/14 374/141 |

(Continued)

FOREIGN PATENT DOCUMENTS

| | | |
|---|---|---|
| DE | 60032682 T2 | 11/2007 |
| JP | 04055654 A * | 2/1992 |
| JP | 2012159332 A | 8/2012 |

*Primary Examiner* — Gail Kaplan Verbitsky
(74) *Attorney, Agent, or Firm* — Vichit Chea; Price Heneveld LLP

(57) ABSTRACT

A temperature sensor for measuring the temperature of a surface of the heat exchanger of a motor vehicle air conditioning system. The sensor includes a sensor housing constructed for assembly in an opening of a heat exchanger housing and having a sensor head constructed for thermal contact with a heat exchanger surface. The sensor head is configured to have thermal contact only with the outer ends of cooling ribs of the heat exchanger or only with a thermally conductive plate which connects cooling ribs.

7 Claims, 1 Drawing Sheet

(56) References Cited

U.S. PATENT DOCUMENTS

| | | | | |
|---|---|---|---|---|
| 8,988,881 B2* | 3/2015 | Koplow | ............... | F04D 25/0606 |
| | | | | 361/707 |
| 2003/0230404 A1* | 12/2003 | Herrmann | ............ | B60H 1/2209 |
| | | | | 165/287 |
| 2006/0288968 A1* | 12/2006 | Damian | .................... | F01P 11/00 |
| | | | | 123/41.15 |
| 2009/0255142 A1* | 10/2009 | Brown | .................... | D06F 58/20 |
| | | | | 34/79 |
| 2011/0045326 A1* | 2/2011 | Leuthner | ........... | H01M 10/5004 |
| | | | | 429/72 |
| 2012/0031517 A1* | 2/2012 | Yoshida | ................... | G01K 1/14 |
| | | | | 138/103 |
| 2014/0208773 A1* | 7/2014 | Schroeder | ............... | H01L 35/00 |
| | | | | 62/3.3 |
| 2015/0174988 A1* | 6/2015 | Collmer | ................. | F24H 1/009 |
| | | | | 165/154 |
| 2017/0211844 A1* | 7/2017 | Mizuno | .................... | F24H 9/18 |
| 2018/0345754 A1* | 12/2018 | Gruenwald | ........ | B60H 1/00328 |

* cited by examiner

TEMPERATURE SENSOR FOR THE HEAT EXCHANGER OF A MOTOR VEHICLE AIR CONDITIONING SYSTEM

FIELD OF THE INVENTION

This invention generally relates to a temperature sensor for measuring the temperature of a surface of the heat exchanger such as the evaporator of a motor vehicle air conditioning system, having a sensor housing which is constructed for assembly in an opening of an evaporator or heat exchanger housing and having a sensor head which is constructed for thermal contact with an evaporator or heat exchanger surface.

BACKGROUND OF THE INVENTION

JP 2012 159 332 A describes a temperature sensor of the generic type which measures the surface temperature of an evaporator between the cooling ribs or plates of the evaporator. The sensor head is pressed between two cooling ribs and has an element of resilient material in order to compensate for production and expansion tolerances. That intermediate space between the cooling ribs in which the sensor head is located is no longer available for air flow and consequently heat exchange. The installation complexity is considerable, wherein it also has to be ensured that the sensor head is introduced by a defined distance into the cooling ribs. Furthermore, a sealed cable passage is required. Since the sensor head locally bends the cooling ribs or plates of the evaporator, a reliable thermal contact is no longer ensured after a replacement of the temperature sensor.

U.S. Pat. No. 5,785,284 describes an evaporator temperature sensor having a housing which is fitted in an opening in an evaporator housing and which is connected by a cable for tolerance compensation to a sensor element which is located in a cylindrical element which is positioned in a hole in the evaporator. Although that temperature sensor can be installed and replaced more easily, a correctly fitting hole has to be provided in the evaporator.

It would be desirable to provide a temperature sensor for the evaporator of a motor vehicle air conditioning system, which sensor does not impede the air flow through the evaporator and can be installed and replaced in a simple and reliable manner with little construction complexity.

SUMMARY OF THE INVENTION

According to one aspect of the present invention, a temperature sensor for measuring temperature of a surface of a heat exchanger of a motor vehicle air conditioning system is provided. The temperature sensor includes a sensor housing constructed for assembly in an opening of a heat exchanger housing, and a sensor head constructed for thermal contact with the surface and configured to have thermal contact only with outer ends of cooling ribs of the heat exchanger or only with a thermally conductive plate which connects cooling ribs.

According to another aspect of the present invention, a temperature sensor for measuring temperature of a surface of a heat exchanger of a motor vehicle air conditioning system is provided. The temperature sensor includes a sensor housing configured for assembly in an opening of a heat exchanger housing, and a sensor head configured to thermally contact the surface of the heat exchanger.

According to a further aspect of the present invention, a heat exchanger for a motor vehicle air conditioning system is provided. The heat exchanger includes a heat exchanger housing, a heat exchanger surface comprising cooling ribs, a sensor housing assembled in an opening of the heat exchanger housing, and a sensor head in thermal contact with the heat exchanger surface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
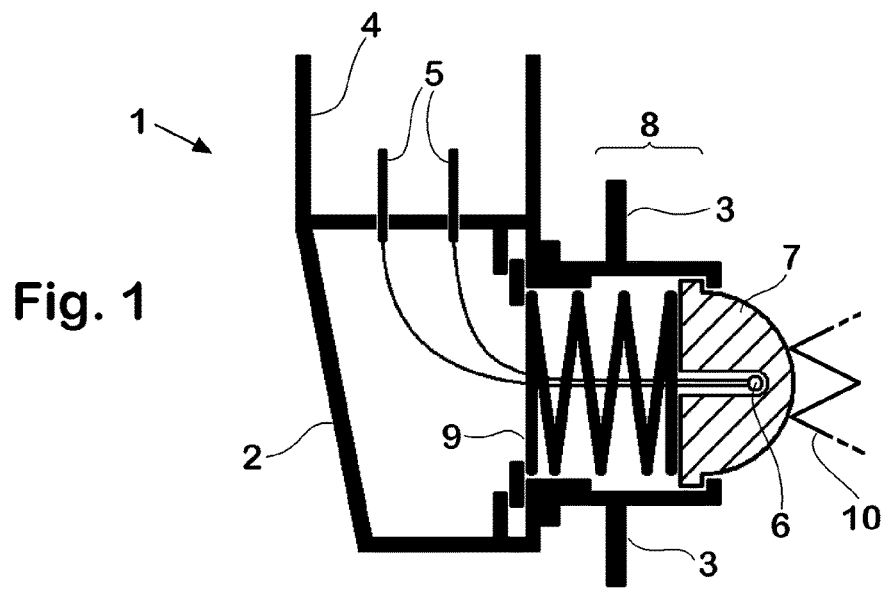
FIG. 1 is a sectional view of a first embodiment of a heat exchanger temperature sensor for measuring temperature of a surface of a heat exchanger of a motor vehicle air conditioning system.

FIG. 1 shows a temperature sensor 1 for measuring the temperature of a surface of the heat exchanger, e.g., evaporator, of a motor vehicle air conditioning system, according to a first embodiment. The temperature sensor 1 has a sensor housing 2 having a bayonet closure 3 for assembly in an opening of an evaporator or heat exchanger housing. The sensor housing 2 has an integrated plug-type connector portion 4 which is integrally constructed with the sensor housing 2 and which has connectors 5 for electrical connection to a sensor element 6 which is installed in a sensor head 7.

In the first embodiment, the sensor head 7 is a round metal component having a semi-spherical front side which forms the end of the sensor head 7 facing an evaporator or heat exchanger surface. The sensor head 7 is movable in the axial direction thereof in the direction toward the heat exchanger surface and away from it, that is to say, it has an axial play 8. Within the axial play 8, the sensor head 7 is permanently pressed by a helical spring 9 in the direction toward the evaporator surface. Thus, the helical spring 9 biases or presses the sensor head 7 against the evaporator surface.

The heat exchanger surface with which the sensor head 7 is intended to have thermal contact comprises or is a component of one or more heat exchange elements of the heat exchanger which are schematically indicated in FIG. 1 as plates or cooling ribs 10 which are arranged in a zigzag manner and the outward extending tips of which the sensor head 7 is intended to touch when it is fitted in the heat exchanger.

Figure 2:
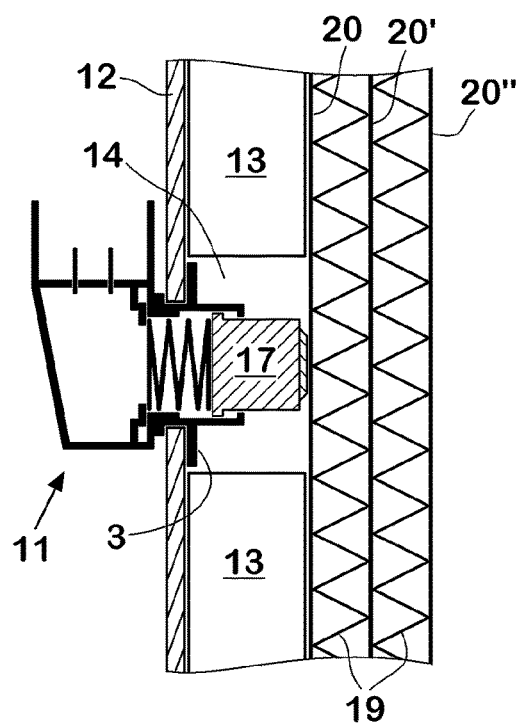
FIG. 2 is a sectional view, drawn to a smaller scale than in FIG. 1, of a second embodiment of heat exchanger temperature sensor which is installed on a heat exchanger.
Figure 3:
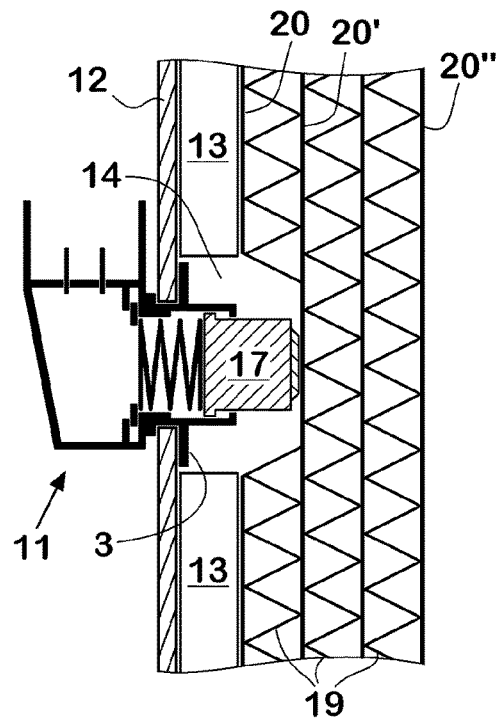
FIG. 3 is a sectional view of the heat exchanger temperature sensor from FIG. 2, installed on the heat exchanger in a different manner, according to another embodiment.

The fitted state of the temperature sensor 1 results from FIGS. 2 and 3 which, however, show a slightly different temperature sensor 11, according to a second embodiment. The temperature sensor 1 shown in FIGS. 2 and 3 differs from the temperature sensor 1 shown in FIG. 1 only in that the sensor head 17 thereof has a planar front side which in this embodiment does not have contact directly with any of the cooling ribs 19, but instead with one of a plurality of planar metal plates 20, 20', 20", between which the cooling ribs 19 move back and forth in a zigzag manner. As seen in FIG. 2, the sensor head 17 touches the outermost metal plate 20 of the heat exchanger. In FIG. 3, the temperature sensor 11 passes through a recess in the outermost metal plate 20 and in the associated cooling ribs and touches the second-outermost metal plate 20' with the sensor head 17 thereof. The metal plates 20, 20' and 20" are shown as planar metal plates, according to one embodiment. It should be appreciated that the metal plates 20, 20' and 20" can be designed as solid plates, extruded flat tubes, bended tubes or welded dual plates, according to other embodiments. With the use of tubes or dual plates, heat exchange refrigerant may pass through the tubes or plates to cool the metal.

It can be seen in FIGS. 2 and 3 that the temperature sensor 1 or 11 is fixed in a heat exchanger housing 12 by means of the bayonet closure 3. A thermally insulating casing 13 is located between the heat exchanger housing 12 and the outermost metal plate 20 around all the heat exchange elements of the heat exchanger. The casing 13 has a recess 14 for the temperature sensor 1 or 11.

The sensor head 7 is configured to have thermal contact only with the outer ends of cooling ribs 10 or plates of the heat exchanger or with a thermally conductive plate 20 or 20' which connects cooling ribs. It has been found that such a thermal contact which does not disrupt the air flow allows a sufficiently precise measurement of the temperature of the heat exchanger surface, particularly if the sensor head 7 is configured to extend through a recess in the thermally insulating casing 13 which generally surrounds the heat exchange elements of the heat exchanger of a motor vehicle air conditioning system as far as an outermost 20 or second-outermost 20' row of cooling ribs or as far as an outermost or second-outermost thermally conductive plate which connects cooling ribs. Such a recess in the thermally conductive casing can be produced with very little complexity because only the punching tool has to be configured accordingly for the plates which the casing comprises.

The temperature sensor 1 is very suitable for heat exchangers, such as evaporators, having a low pressure loss at the refrigerating medium side because here the measurement of the surface temperature is substantially independent of the location. Additionally, in cases in which the measurement of the surface temperature is dependent on the location, a suitable location for the temperature measurement can readily be selected, in particular the coldest location.

The temperature sensor 1 allows simple assembly to the heat exchanger and where applicable a simple replacement of the temperature sensor because no force has to be applied in order to press into the cooling ribs 10 and because it does not have to be checked in a complex manner whether the sensor head 7 has been introduced sufficiently far between the cooling ribs 10.

The temperature sensor 1 allows the sensor head 7 to be located in the fitted state substantially completely outside air flow channels which are constructed between the cooling ribs 10 so that all the air flow channels of the heat exchanger have the same flow resistance according to the configuration, whereas in the prior art of the generic type the sensor head blocks an air flow channel and allows the adjacent air flow channels to become narrower.

In one embodiment, the temperature sensor 1 contains a dedicated, preferably metal spring which is particularly a helical spring 9 and which is configured to press the sensor head 7 permanently against the heat exchanger surface 10. The thermal contact is permanently maintained by the dedicated tension spring. The dedicated spring ensures that the pressing pressure always remains the same, which ensures good vibration resistance and a precision of the temperature measurement which remains the same during operation. Tension elements other than a helical spring may be employed, according to other embodiments. For example, a leaf spring could be used to press the sensor heat 7 against the thermal surface and the sensor head 7 may be assembled by insertion into a slit from a side of the bayonet closure 3. As a result, a replaced temperature sensor also obtains thermal contact which is just as good with respect to the heat exchanger surface as the previously installed sensor.

In contrast, the temperature sensor of the prior art of the generic type typically has a resilient bellows which primarily has other functions, that is to say, to connect the sensor head mechanically to a sensor holder which is mounted in the heat exchanger housing and to provide lateral play for the sensor head so that it can in any case be introduced between two cooling ribs. Although a resilient bellows may also be able to exert a given pressure in an axial direction, rubber has a given plasticity so that an axial pressing pressure becomes smaller over time. In fact, the thermal contact is brought about in the prior art mentioned primarily in that the sensor head which is introduced between two cooling ribs urges them slightly apart, wherein the thermal contact is maintained by the inherent resilience of the cooling ribs which may also become smaller over time, however.

In one embodiment, the sensor head 7 has a convex cross section at the end thereof facing the heat exchange elements 10 of the heat exchanger. If the sensor head 7 is intended to touch a number of cooling ribs of the heat exchanger directly, the diameter of the sensor head and the smallest radius of curvature of the convexity should be greater than the spacing between two cooling ribs 10 so that the sensor head is barely introduced between the cooling ribs and each air flow channel can be flowed through by air in a practically non-impeded manner. The convexity may be present in one or two dimensions, that is to say, the sensor head may be formed at the end, for example, approximately in a semi-spherical manner or approximately in a semi-cylindrical manner or in a spherical manner in any other manner. In the case of, for example, a semi-spherical sensor head, although the metal contact surfaces between the sensor head and cooling ribs would be relatively small even if the cooling rib edges can give way slightly and can closely fit against the sensor head, this may be sufficient if the sensor head has a small thermal capacity and is thermally insulated with respect to the remaining portions of the temperature sensor. In the case of, for example, a semi-cylindrical sensor head, the metal contact surfaces would be linear and therefore greater.

In another embodiment, the sensor head 7 has a planar surface at the end thereof facing the heat exchange elements of the heat exchanger. The smallest diameter of that planar surface is preferably greater than the spacing between two cooling ribs so that the sensor head is arranged in any case completely outside the air flow through the heat exchanger and consequently does not impede the air flow.

As mentioned, the surface of the sensor head 7 may have direct thermal contact with two or more cooling ribs. An even better thermal contact may be possible if the planar surface of the sensor head has extensive thermal contact with a thermally conductive plate 20 which connects the cooling ribs. Such an embodiment also has the advantage that the temperature measurement cannot be distorted by the temperature of the air flowing through the heat exchanger.

A sensor head 7 having a planar thermal contact surface may have thermal contact with an outermost thermally conductive plate 20 which connects cooling ribs, or it may extend through a recess 14 in the outermost thermally conductive plate and the associated cooling ribs and have thermal contact with a second-outermost thermally conductive plate 20' which connects cooling ribs.

In one embodiment, a plug-type connector portion 4 for electrical connection to an electronic sensor element which is fitted in the sensor head is structurally integrated in the temperature sensor 1 instead of the plug-type connector portion being fixed to a cable which leads out of the temperature sensor, as in the generic prior art. It also thereby becomes unnecessary to provide a cable passage in the heat exchanger housing.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A temperature sensor for measuring temperature of a surface of a heat exchanger of a motor vehicle air conditioning system, comprising:
   the heat exchanger has a heat exchanger housing;
   a sensor housing constructed for assembly in an opening of the heat exchanger housing; and
   a sensor head constructed for thermal contact with the surface and configured to have thermal contact only with outer ends of cooling ribs of the heat exchanger, wherein the sensor head is arranged in a fitted state substantially completely outside air flow channels which are constructed between the cooling ribs.

2. The temperature sensor as claimed in claim 1, wherein the sensor head is configured to extend through a recess in a thermally insulating casing which surrounds heat exchange elements of the heat exchanger as far as an outermost or second-outermost row of cooling ribs.

3. The temperature sensor as claimed in claim 1, wherein the temperature sensor contains a dedicated spring which is configured to press the sensor head permanently against the heat exchanger surface.

4. The temperature sensor as claimed in claim 1, wherein the sensor head has a convex cross section at the end thereof facing the heat exchanger surface.

5. The temperature sensor as claimed in claim 1, wherein the sensor head has a planar surface at the end thereof facing the heat exchanger surface.

6. The temperature sensor as claimed in claim 1, wherein a plug-type connector portion for electrical connection to an electronic sensor element which is fitted in the sensor head is structurally integrated in the temperature sensor.

7. The temperature sensor as claimed in claim 1, wherein the heat exchanger is an evaporator.

\* \* \* \* \*